April 22, 1924.
G. SEYFERLE
1,490,986
MAP WITH PIVOTED FINDER
Filed Jan. 4, 1922
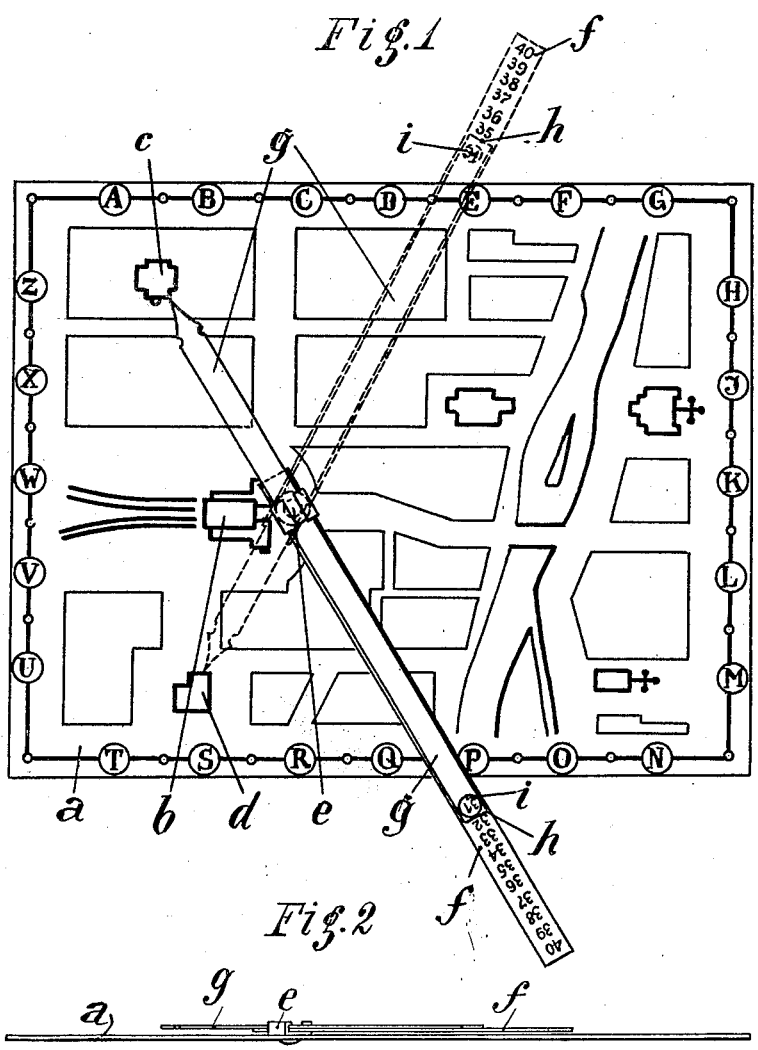

Patented Apr. 22, 1924.                                                         1,490,986

UNITED STATES PATENT OFFICE.

GUSTAV SEYFERLE, OF MUNICH, GERMANY, ASSIGNOR TO WILLY ADLER, OF MECKLENBURG, GERMANY, AND VIGO MORTENSEN, OF LAUENBURG, GERMANY.

MAP WITH PIVOTED FINDER.

Application filed January 4, 1922.   Serial No. 526,895.

*To all whom it may concern:*

Be it known that I, GUSTAV SEYFERLE, a citizen of the German Republic, residing at Munich, Germany, have invented certain new and useful Improvements in Maps with Pivoted Finders, of which the following is a specification.

This invention relates to a town map or the like with marginal divisions and a corresponding alphabetic register with graduations, a finder in the shape of a hand being pivotally connected with said map to be used for locating any required point on the map. Such maps are not very practical for the reason that the finder covers the points to be discovered. This inconvenience is avoided according to the invention by connecting with the pivotable finder an indicating hand adapted to be moved in longitudinal direction, whose free outer end is then used for locating purposes, leaving the looked for objective and surrounding portions quite unobstructed.

In order that the invention may be clearly understood, I shall proceed to describe the same with reference to the form of construction shown by way of example on the accompanying drawing, wherein:—

Fig. 1 is a plan view of a town map with finder and indicating hand.

Fig. 2 is a side elevation of Fig. 1.

Fig. 3 shows a fragmentary view of a table bearing indicia or legends for locating the respective places on the map.

On the town map $a$ the railway station for instance is indicated by $b$ and two important buildings are designated by $c$ and $d$ respectively. At a convenient point, for instance in proximity of the station $b$, a finder $f$ which consists of a strip of paper or the like is pivotally fixed and an indicating hand or pointer $g$ is movably mounted on the same so that it can be displaced upon the finder in longitudinal direction. On the margin of the map $a$ is placed a scale and the divisions are designated by the capital letters A to Z. The divisions between the capital letters are further divided at the middle by a dot or a small circle. Several sub-divisions could be arranged instead of the one sub-division intermediate the letters. The finder $f$ has a graduation which corresponds with the scale to which the map is drawn, for instance a scale with the numbers 1 to 40.

The pointer may be provided with a window $i$ close to its free outer edge $h$, either one of which may be used in reading the indicia on the arm $f$, depending upon the constructional modification employed.

To the map $a$ a table $k$ (Fig. 3) of the streets, squares, buildings or the like is added in which the streets, squares, buildings or the like are designated by the margin divisions of the map and the numbers of the finder.

In operation, the user looks in the table $k$ for the indicia or legends opposite the alphabetically or otherwise arranged objectives. If, for instance, the user wants to find the theater $c$, he will find the legend A-31 (or A-32, as the case may be, depending upon whether the particular locator is provided with a window $i$ or not); he then swings the arm $f$ until its general direction is in line with the marginal A, and he now slides the hand $g$ along toward A until the index number 31 appears within the window $i$ (or the index number 32 shows just beyond the cross-edge $h$), when the point of the indicator will exactly indicate the theater $c$, without hiding it in any way.

By providing the member $f$ with indicia indicating in miles and fractions thereof the exact distance from the pivot point to the various positions on the map, the user simultaneously with finding his objective, can read off also the distance thereof from the railroad station or wherever the indicator is pivoted on the map as starting point.

The position of the indicator device when locating the objective $d$ is shown in phantom outline in Fig. 1, the index number 34 appearing in the window $i$, or, when no window is used, the index number 35 appearing just beyond the edge $h$.

I claim:—

1. A map including a location finder, comprising in combination with a conventional map presenting indicia on all four margins, a telescopic member, comprising a guide piece pivotally mounted on the body of the map at a point intermediate the margins thereof, a swingable arm in rigid association with said guide pivot, indicia on said swingable arm, and a pointer hand adapted for sliding displacement in said pivotal guide piece in superimposed parallelism with said swingable arm, the inner end of said slidable hand adapted to selectively co-operate with said swingable arm indicia, and the other pointed end of said hand adapted for selective co-operation with said marginal map indicia and for indicating the exact location on the map of the objective.

2. A map including a location finder, comprising in combination with a conventional map presenting indicia on all four margins, a telescopic member, comprising a guide piece pivotally mounted on the body of the map at a point intermediate the margins thereof, a swingable arm in rigid association with said guide pivot, indicia on said swingable arm, and a pointer hand adapted for sliding displacement in said pivotal guide piece in superimposed parallelism with said swingable arm, the inner end of said slidable hand adapted to selectively co-operate with said swingable arm indicia, and the other end of said hand being pointed and adapted for selective co-operation with said marginal map indicia and for indicating the exact location on the map of the objective, and said swingable arm indicia respectively denoting the distances from said pivotal guide piece of the various map locations respectively indicated by the point of said slidable hand.

In testimony whereof I affix my signature in presence of two witnesses.

GUSTAV SEYFERLE.

Witnesses:
PAUL DREY,
RICHARD LUTZ.